United States Patent Office 3,247,179
Patented Apr. 19, 1966

3,247,179
HEPTAPEPTIDES
Robert Schwyzer, Riehen, and Heini Kappeler, Birsfelden, Switzerland, assignors to Ciba Corporation, a corporation of Delaware
No Drawing. Filed Feb. 27, 1961, Ser. No. 91,651
Claims priority, application Switzerland, Mar. 11, 1960, 2,773/60; June 17, 1960, 6,917/60; July 15, 1960, 8,131/60
11 Claims. (Cl. 260—112.5)

The present invention relates to the manufacture of new heptapeptides of the formula L-α-(lower mercaptoalkyl) - α - aminoacetyl-L-glutaminyl-L-histidyl-L-phenylalanyl-L-α-(lower aminoalkyl)-α-aminoacetyl-L-tryptophyl-glycine, the mercapto group of which is unsubstituted, or substituted by a lower alkyl radical such as ethyl, propyl or more especially methyl, as well as corresponding compounds that contain the residue of glutamic acid instead of the glutamine residue, and derivatives and salts of these compounds. Derivatives are here intended to be above all functional derivates, such as esters and amides, also N-substition products, such as N-acyl derivatives, especially N-acetyl derivatives, and compounds having the usual protective groups. The alkylene group of the mercaptoalkyl and aminoalkyl radical contains 1–4, preferably 2–3 carbon atoms.

An L-α-lower mercaptoalkyl-α-aminoacetyl group is, for example, the residue of cystein, homocysteine or their S-lower alkyl, such as methyl, ethyl or propyl derivatives, or more especially the methionyl residue. The residue of an L-α-(lower aminoalkyl)-α-aminoacetic acid is more especially L-arginyl, L-ornithyl or L-lysyl.

The new compounds display the action of the natural pituitary hormones which stimulate the melanocytes (MSH-action). Above all they stimulate the release of the adrenocorticotropic hormone (ACTH) from the antepituitary gland (Corticotropin Releasing Factor action=CRF action) and they are therefore intended to be used as medicaments. They are also suitable as intermediates for the manufacture of medicaments comprising a long chain of amino acids, inter alia for the manufacture of the melanocytes-stimulating hormone and of ACTH. An outstanding CRF action is displayed above all by L-methionyl - L-glutaminyl-L-histidyl-L-phenylalanyl-L-arginyl-L-tryptophyl-glycine of the formula the efficacy of which is about 100 times that of CRF-active compounds isolated from pituitary glands.

The new peptides are prepared by methods conventionally used for the manufacture of peptides, the amino acids being linked in the order of succession defined above either singly or as preformed small peptide units. Thus, one of the amino-acid molecules or peptide molecules in the form of an ester with a further aminoacid molecule or peptide molecule containing a protected amino group may be linked in the presence of a condensing agent such as a carbodiimide or of a phosphoric acid ester halide, or the amino acid ester or peptide ester containing a free amino group may be reacted with an amino acid or a peptide having an activated carboxyl group (and a protected amino group), for example with an acid halide, azide, anhydride, imidazolide or an activated ester such as cyanomethyl ester or carboxymethyl thiol ester. Conversely, an amino acid or a peptide containing a free carboxyl group (and a protected amino group) can be reacted with an amino acid or a peptide containing an activated amino group (and a protected carboxyl group), for example, with a phosphite amide. Any one of the aforementioned methods can be applied to any formation of peptide bonds according to the present process, but the methods used in the example are particularly advantageous.

As has been mentioned above, there are several possibilities available for synthesizing the heptapeptide from the amino acids or from preformed small peptide units. According to one variant of the process an ester of the hexapeptide L-glutaminyl- or (glutamyl)-L-histidyl-L-phenylalanyl - L - α-(lower aminoalkyl)-α-aminoacetyl-L-tryptophyl-L-glycine is condensed with an L-α-(lower mercapto-alkyl)-α-aminoacetic acid containing a protected amino group, for example according to the scheme

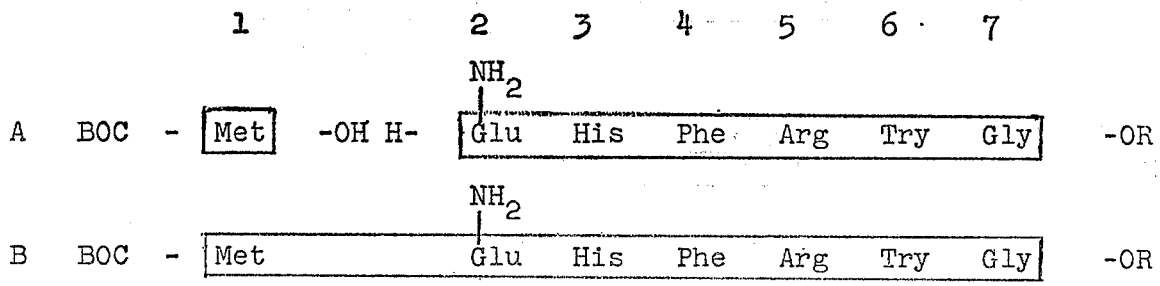

If cystein is the first amino acid to be coupled with the hexapeptide, it is also possible to proceed according to the method of Sheehan (Sheehan et al., J. Am. Chem. Soc., 80, 1158 [1958]) using 4-carboxy-3-formyl-2:2-dimethyl-thiazolidine.

Furthermore, an ester of the pentapeptide L-histidyl-L-phenylalanyl-L-α-(lower aminoalkyl)-α-amino-acetyl-L-tryptophyl-L-glycine can be condensed with the dipeptide

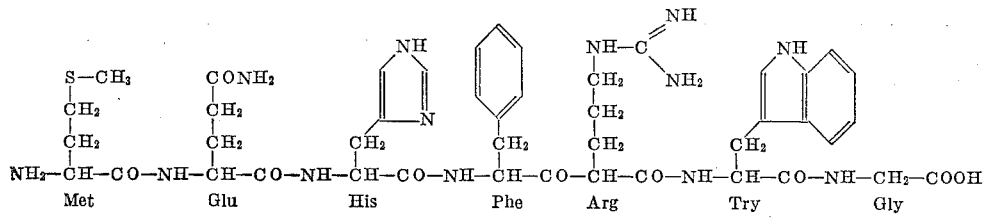

formed from the first two amino acids, for example, according to the scheme

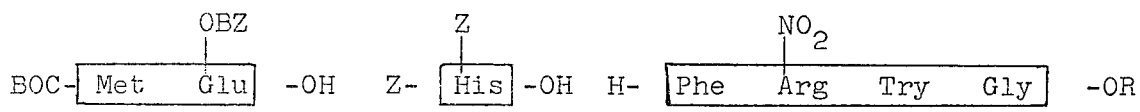

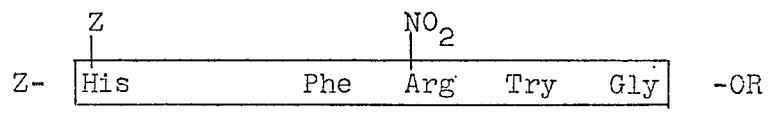

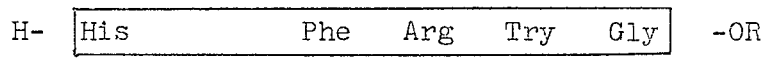

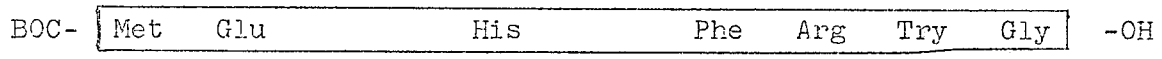

According to another advantageous variant the tripeptide synthesized from the first three amino acids is condensed with the tetrapeptide synthesis from the last four amino acids, for example, according to the scheme

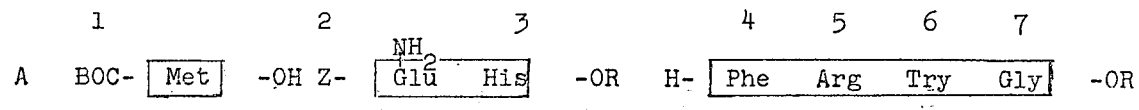

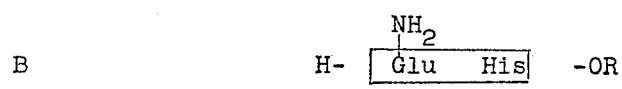

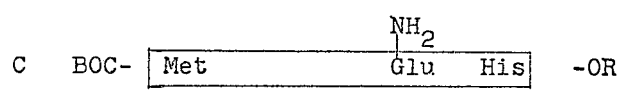

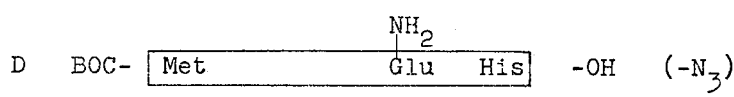

In the above schemes BOC represents a tertiary butyloxycarbonyl group, Z a carbobenzoxy group, OBZ a benzyl ester group and OR a lower alkyl ester group. Finally, the amino group of the methionyl residue and the carboxyl group of the glycine residue are liberated.

The peptides used as starting materials can be prepared, for example, by the process described in our U.S. patent application Ser. No. 822,187 filed June 23, 1959, now U.S. Patent No. 3,093,627, issued June 11, 1963.

Any free functional groups not participating in the reaction are advantageously protected, more especially by residues that are easy to eliminate by hydrolyzing or reduction. The carboxyl group is preferably protected by esterification, for example, with methanol, benzyl alcohol, para-nitrobenzyl alcohol; the amino group, for example, by introducing a tosyl or trityl residue or a carbobenzoxy group or a colored protected group such as the para-phenylazo-benzyloxy-carbonyl group and the para-(para'-methoxyphenylazo)-benzyloxy-carbonyl group (MZ) or more especially the tertiary butyloxy carbonyl residue;

and the mercapto group is protected by the benzyl group. The amino group in the guanidino grouping of arginine can be protected by the nitro group; it is however not absolutely necessary to protect the aforementioned amino group of arginine during the reaction.

The conversion of a protected mercapto or free amino group into a free group and the conversion of a functionally converted carboxyl group into a free carboxyl group during the manufacture of the heptapeptides and intermediates, are carried out by a known treatment with a hydrolyzing or reducing agent respectively.

Depending on the reaction conditions employed the new compounds are obtained in the form of their bases or their acid addition salts. From the salts the bases can be prepared in the known manner. The bases can be converted into salts by reaction with acids suitable for making therapeutically useful salts, such, for example, as salts of inorganic acids, for example, hydrohalic acids, for example hydrochloric or hydrobromic acid, or nitric acid, thiocyanic acid, sulfuric acid, phosphoric acid, or with organic acids such as acetic, propionic, glycollic, lactic, pyruvic, oxalic, malonic, succinic, maleic, fumaric, tartaric, citric, benzoic, cinnamic, salicyclic, 2-phenoxybenzoic or 2-acetoxybenzoic, mandelic, methanesulfonic, ethanesulfonic, hydroxyethane sulfonic, benzenesulfonic or toluenesulfonic acid.

The heptapeptides obtained by the present process can be used in the form of pharmaceutical preparations which contain the peptide or a derivative or a non-toxic acid addition salt thereof in admixture with a pharmaceutical organic or inorganic vehicle suitable for enteral or parenteral administration. Suitable vehicles are substances that do not react with the polypeptides such, for example as gelatine, lactose, glucose, sodium chloride, starches, magnesium stearate, talc, vegetable oils, benzyl alcohols, gums, poly-alkylene glycols, white petroleum jelly, cholesterol or other known medicinal vehicles. The pharmaceutical preparations may be, for example, tablets, dragées, powders, ointments, creams or suppositories, or in liquid form, solutions, suspensions or emulsions. They may be sterilized and/or may contain assistants such as preserving, stabilizing, wetting or emulsifying agents. They may also contain further therapeutically useful substances.

In the following examples, which illustrate the invention, the paper chromatography was carried out with the use of the following systems:

System 43=tertiary amyl alcohol:isopropanol:water= 100:40:55
System 45=secondary butanol:3% ammonia=100:44
System 50=tertiary amyl alcohol:isopropanol:triethylamine:veronal:water=100:40:0.8:1.8 grams:50
System 52=n-butanol:acetic acid:water=100:10:30
System 54=secondary butanol:isopropanol:monochloroacetic acid:water=70:10:3 grams:40
System 56=secondary butanol:isopropanol:5% veronal sodium:water=100:15:10:60

*Example 1.—L-glutaminyl-L-histidine methyl ester dihydrochloride*

5.09 grams (10.8 millimols) of N-carbobenzoxy-L-glutaminyl-L-histidine methyl ester (see application S.N. 822,187 filed June 23, 1959 and now U.S. Patent No. 3,093,627) are hydrogenated to saturation in 200 cc. of absolute methanol with addition of 2.2 equivalents of methanolic hydrochloric acid in the presence of 600 mg. of palladium-carbon catalyst of 10% strength. The carbon dioxide formed is absorbed with potassium hydroxide solution in a second interposed duck-shaped hydrogenating vessel. After 50 minutes 266 cc. of hydrogen (theory 245 cc.) have been absorbed and the hydrogenation is complete. The catalyst is filtered off and the filtrate is evaporated in vacuo at 40° C. The foamy residue is dissolved in a small amount of methanol and the dipeptide ester dihydrochloride is reprecipitated with acetone. Drying at 40° C. in a high vacuum yields 4.76 grams of glutaminyl histidine methyl ester dihydrochloride as a white foamy product.

Paper chromatographic examination of the dipeptide ester in the systems 43 and 54 reveals only one spot each of positive ninhydrin and Pauly reaction; $R_f$=value 0.18 and 0.34 respectively.

*Example 2.—N-tertiary butyloxycarbonyl-methionyl-L-glutaminyl-L-histidine methyl ester*

2.4 grams (6.5 millimols) of glutaminyl-histidine methyl ester dihydrochloride are dissolved in 15 cc. of absolute N:N'-dimethyl formamide and while stirring the solution at 0° C. it is reacted with 2.0 cc. (14.4 millimols) of triethylamine. After 30 minutes the precipitated triethylamine hydrochloride (1.65 grams=91% of theory) is filtered off, the clear solution is treated with 2 cc. of benzene, and a few cc. of solvent are then distilled off at 20 to 30° C. in a high vacuum.

At the same time a solution of 1.6 grams (7.2 millimols) of diimidazole carbonyl of 75% strength in 5 cc. of dimethyl formamide is treated with 1.8 grams (7.2 millimols) of BOC methionine and the mixture is allowed to react for 15 minutes at room temperature.

The two solutions are combined while being cooled with ice and then allowed to react for 15 hours at room temperature.

The solvent is evaporated in vacuo at 40° C. and the BOC tripeptide ester is precipitated with much ethyl acetate.

The yield amounts to 3.24 grams. M.P. 185–187° C. 2.9 grams of the crude ester, crystallized from 35 cc. of methanol, yield 1.85 grams (53% of theory); M.P. 192–193° C. The analytically pure product obtained by repeated recrystallization from methanol melts at 200° C. Optical rotation $[\alpha]_D^{29.5}$=—25.9+0.9° (c.=1.120 in methanol).

In the paper chromatographic examination the BOC tripeptide methyl ester shows a positive reaction with Pauly reagent and chloroplatinic acid/potassium iodide and in the Systems 43 and 54 the $R_f$-values 0.88 and 0.82 respectively.

*Example 3.—N-tertiary butyloxycarbonyl-L-methionyl-L-glutaminyl-L-histidine hydrazide*

1.2 grams (2.25 millimols) of BOC tripeptide ester are dissolved with heating in 16 cc. of dimethyl formamide, the solution is then cooled to room temperature and mixed with 1 cc. of hydrazine hydrate and kept at 20° C. After 18 hours the reaction product is precipitated with much ether, the amorphous reaction mixture is filtered through a G4-glass frit, thoroughly rinsed with ether on the filter, and the filter residue is dried in a high vacuum over phosphorus pentoxide and sulfuric acid.

On recrystallization from 12 cc. of methanol the crude BOC tripeptide hydrazide yields 840 milligrams (70% of theory) of pure BOC methionyl glutaminyl histidine hydrazide.

The analytically pure product resulting from a further crystallization from methanol melts at 172 to 173° C. Optical rotation $[\alpha]_D^{28}$=—30.9±0.41 (c.=2.559 in methanol).

The coefficient of distribution for the system methanol:water:chloroform:carbon tetrachloride=8:2:5:5 is 5.4.

In the paper chromatogram the compound displays in the Systems 43, 50 and 54 with chloroplatinic acid/potassium iodide and Pauly reagent only 1 spot each.

The $R_f$-values are
43/0.86
50/0.81
54/0.72.

The hydrazide can be converted by a known method into the azide and the latter can be converted with the tetrapeptide ester H-Phe-Arg-Try-Gly-OCH$_3$-HCl into the BOC heptapeptide ester (see Example 6).

*Example 4.—N-tertiary butyloxycarbonyl-L-methionyl-L-glutaminyl-L-histidine*

1.0 gram (1.9 millimols) of BOC-Met-Glu(NH$_2$)-His-OCH$_3$ are dissolved with heating in 19 cc. of dioxane of 50% strength, the solution is cooled to room temperature and treated under nitrogen with 4.45 cc. of 0.47 N-barium hydroxide solution, and the mixture is allowed to hydrolyse for 30 minutes at room temperature.

The hydrolysis solution is neutralized with 2.1 cc. of N-sulfuric acid (final pH=5.7) while being cooled with ice and the solvent is then evaporated in vacuo at 40° C. The amorphous residue is taken up in 25 cc. of cold water and the barium sulfate is filtered off through Celit.

After evaporation of the water there are obtained 970 mg. (99% of theory) of amorphous butyloxycarbonyl tripeptide.

The R$_f$-values in the Systems 43 and 50 are 0.65 and 0.55 respectively.

After having been repeatedly recrystallized from a mixture of methanol and ethyl acetate, the analytically pure product melts at 198–199° C. with decomposition. Optical rotation $[\alpha]_D^{26.5}=22.2°\pm0.7°$ (c.=1.1695 in N-acetic acid).

*Example 5.—L - glutaminyl-L-histidyl-L-phenylalanyl-L-arginyl-L-L-tryptophyl-glycine methyl ester trihydrochloride*

1.0 gram (1 millimol) of N - carbobenzyloxy - glutaminyl-histidyl-phenylalanyl-arginyl-tryptophyl - glycine methyl ester dihydrochloride (see application Serial No. 822,187, filed June 23, 1959 and now U.S. Patent No. 3,093,627) are hydrogenated to saturation in 20 cc. of absolute methanol with the addition of 1 equivalent of methanolic hydrochloric acid in the presence of 200 mg. of palladium-carbon catalyst of 10% strength. The carbon dioxide formed is absorbed with potassium hydroxide solution in a second interposed duck-shaped hydrogenation vessel. After 5 hours 23.6 cc. of hydrogen (theory 22 cc.) have been taken up and the hydrogenation is complete. The catalyst is filtered off and the filtrate is evaporated in vacuo at 40° C., and the resulting foamy evaporation residue is reprecipitated once from methanol+ether.

In the paper chromatogram in the systems 50 and 54 the hexapeptide ester reveals the R$_f$-values 0.68 and 0.55 respectively.

The hexapeptide methyl ester is further processed without purification.

*Example 6.—N-tertiary butyloxycarbonyl-L-methionyl-L-glutaminyl - L - histidyl - L - phenylalanyl - L-arginyl-L-tryptophyl-glycline methyl ester hydrochloride*

(a) *From BOC tripeptide (Example 4) and L-phenylalanyl-L-arginyl-L-tryptophyl-glycine methyl ester hydrochloride.*—3.8 grams (5.4 millimols) of phenylalanyl-arginyl-tryptophyl-glycine methyl ester dihydrochloride (still contaminated with about 1 equivalent of ammonium chloride) in 18.5 cc. of N:N'-dimethyl formamide are reacted with stirring at 0° C. for 40 minutes with 0.83 cc. (5.9 millimols) of triethylamine. The resulting triethylamine hydrochloride is separated and the excess triethylamine is evaporated in a high vacuum for 10 minutes at 30° C.

The solution is again cooled to 0 to 5° C. and mixed with a pre-cooled solution of 2.5 grams of BOC tripeptide (Example 4) in 18.5 cc. of dimethyl formamide and the whole is then diluted with 28 cc. of acetonitrile. 1.11 grams (5.4 millimols) of dicyclohexyl carbodiimide in 5.4 cc. of dimethyl formamide+acetonitrile 1:2 are added and the whole is allowed to react for 48 hours at 0° C.

The urea formed (0.85 gram=78% of theory) is filtered off, rinsed on the filter with a few cc. of a mixture of dimethyl formamide+ethyl acetate 1:1 and the crude reaction product is precipitated with much ethyl acetate.

The crude, BOC heptapeptide ester, which is still contaminated with starting material, is filtered off, rinsed on the filter with much ethyl acetate and petroleum ether and then dried in a high vacuum at 40° C., to yield 5.6 grams of an amorphous product. The paper chromatogram (Systems 43 and 50) reveals in addition to a preponderance of BOC heptapeptide ester (R$_f$-values 0.75 and 0.85 respectively) a small amount of BOC tripeptide (R$_f$-values 0.66 and 0.59, respectively).

The presence of the BOC tripeptide ester does not disturb the subsequent synthesis so that there is no need for purification, and the crude product can be used as it is.

The pure BOC-heptapeptide ester is obtained by distribution over 90 stages, in an apparatus with a phase volume of 100 cc., between n-butanol/0.1-m ammonium acetate (pH 7.1). Tests with diazotized sulfanilic acid and ninhydrin reveal mainly BOC-tripeptide in elements 24–38; a mixture of starting tetrapeptide and little BOC-heptapeptide ester in the elements 64–82; whereas in the fractions 83–91 there are 7.37 g. of paper-chromatographically pure BOC-heptapeptide ester, R$_f$ 43=0.43; R$_f$ 54=0.75. For analysis a test portion is recrystallized from dioxane of 95% strength. Melting point = 173–174°; $[\alpha]_D^{25}=32°\pm1°$ (c.=1.175 in dimethyl formamide).

(b) *From BOC methionine and hexapeptide ester (Example 5).*—4.73 grams (4.9 millimols) of hexapeptide methyl ester trihydrochloride in 30 cc. of freshly distilled dimethyl formamide are reacted with stirring with 1.46 cc. (11.3 millimols) of triethylamine for 40 minutes at 0° C. and the triethylamine hydrochloride formed is filtered off. The excess triethylamine is evaporated in a high vacuum at 30° C.

The above solution is combined with 1.61 grams of BOC methionine in 8 cc. of a 1:1 mixture of dimethyl formamide and acetonitrile, the mixture is again cooled to 0° C. and treated with 1.34 grams of dicyclohexyl carbodiimide in 4 cc. of a 1:1 mixture of dimethyl formamide and acetonitrile.

The mixture is allowed to react for 2 days at 0° C., the urea which has crystallized out is suctioned off and the reaction product is precipitated with much ethyl acetate.

The crude product is thoroughly rinsed on the suction filter with ethyl acetate and petroleum ether and finally dried in a high vacuum at 40° C. until its weight remains constant. Yield: 3.36 grams of crude, protected heptapeptide ester (62% of theory).

To purify the product, 2.7 grams thereof are distributed over 70 stages in a Craig distribution apparatus (20 cc. phase volume) between n-butanol and acetic acid of 1% strength.

The test with diazotized sulfanilic acid reveals the presence of substance in the distribution fractions 12 to 38; the fractions 12–16 (A)—17–18 (B)—19–25 (C)—26–29 (D)—30–33 (E) and 34–38 (F) are combined and the solvent is evaporated in vacuo at 40° C.

In the paper chromatogram (Systems 43 and 54) the three fractions B, C and D display only a spot positive to Pauly reagent (R$_f$ 43=0.72 and R$_f$ 54=0.75); the two fractions E and F further contain about 5% of a substance that migrates faster and is likewise of positive reaction to Pauly reagent.

Fractions B, C and D combined yield 1.0 gram of pure BOC heptapeptide ester. From fractions E and F a further 400 mg. of a slightly impure substance are obtained.

*Example 7. — L - methionyl - L - glutaminyl-L-histidyl-L-phenylalanyl - L - arginyl - L-tryptophyl-glycine-methyl ester*

(a) *Cleavage by means of trifluoracetic acid.*—100 mg. of BOC-heptapeptide ester (Example 6) are treated with 0.25 cc. of anhydrous trifluoracetic acid and allowed to react for 50 minutes at room temperature. The trifluoracetic acid is evaporated under reduced pressure at room temperature, and the residue triturated with much absolute ether.

The trifluoracetate of heptapeptide ester is obtained in the form of a fine, slightly reddish powder.

In the paper chromatogram (Systems 54 and 56) is displays only one spot each of positive Pauly and ninhydrin reaction; $R_f$-value (54) 0.60 and (56) 0.77, respectively.

The compound is sufficiently pure and can be used for further reaction and CRF test as it is.

(b) *Cleavage my means of hydrochloric acid in methanol.*—100 mg. of BOC-heptapeptide ester (Example 6) are dissolved with slight heating in 1 cc. of absolute methanol, the solution cooled to room temperature and treated with 1 cc. of 1.5 N-ethanolic hydrochloric acid. The mixture is kept at room temperature for one hour and the methanol then evaporated under reduced pressure. The oily residue is triturated repeatedly with much absolute ether, the trihydrochloride heptapeptide ester solidifying slowly. In the paper chromatogram it shows the same $R_f$ values as indicated under (a).

*Example 8.—L-methionyl-L-glutaminyl-L-histidyl-L-phenylalanyl-L-arginyl-L-tryptophyl-glycinamide*

20 mg. of heptapeptide ester-trifluoracetate or trihydrochloride (Example 7) are allowed to react for 24 hours at room temperature with 1 cc. of 8.2 N-ammoniacal methanol solution. The methanol is evaporated in vacuo and the residue triturated with much absolute ether.

In the paper chromatogram the heptapeptide amide displays only one spot each of positive Pauly and ninhydrin reaction. The $R_f$-values in the Systems 54 and 56 are 0.47 and 0.65 respectively.

*Example 9.—N-tertiary-butyloxycarbonyl-L - methionyl-L-glutaminyl-L-histidyl-L-phenylalanyl-L - arginyl - L-tryptophyl-glycine*

In the course of 43 minutes a total of 4.6 cc. of 0.5 N-sodium hydroxide solution is gradually added to 980 mg. (0.93 millimol) of pure BOC heptapeptide methyl ester hydrochloride (see Example 6) in dioxane of 50% strength, while maintaining the pH value between 10.5 and 11.2.

The mixture is adjusted to pH=5 by adding 0.4 cc. of 2 N-hydrochloric acid and a few drops of glacial acetic acid, 5 drops of nonane-5-ol are added, and the solvent is evaporated in vacuo at 40° C., to yield 1.0 gram of a crude hydrolysis product which is contaminated with salt.

The paper chromatogram of the crude BOC heptapeptide reveals in addition to the main spot of BOC Met-Glu(NH₂)-His-Phe-Arg-Try-Gly-OH also a small amount of a compound which reacts positive to Pauly reagent and migrates more slowly. $R_f$ 45=0.70; $R_f$ 43=0.67;

$$R_f\ 54 = 0.76$$

After counter-current distribution in n-butanol/0.1-m. ammonium acetate (pH=7) over 150 stages, the pure BOC-heptapeptide (stages 128–140) can be crystallized from 50% methanol; $R_f$ (43) 0.70; $R_f$ (45) 0.70. Melting point=212° (decomposition); $[\alpha]_D^{26} = -21.8° \pm 0.40$ (c.=1.008 in dimethyl formamide).

The above BOC heptapeptide can be further processed as it is.

*Example 10.—L-methionyl-L-glutaminyl-L-histidyl-L-phenylalanyl-L-arginyl-L-tryptophyl-glycine acetate*

A mixture of 1.1 grams (1 millimol) of BOC methionyl-glutaminyl - histidyl - phenylalanyl - arginyl - tryptophyl - glycine and 8.5 cc. of trifluoroacetic acid is kept for one hour at room temperature, whereby the reaction mixture turns dark violet. The trifluoroacetic acid is then substantially evaporated in vacuo and the trifluoroacetate of the heptapeptide is precipitated with much ether. The granular crude product is repeatedly triturated with absolute ether and the slightly greyish compound is dried in a high vacuum, to yield 1.33 grams of a crude product.

To purify the above-mentioned 1.33 grams of crude product it is charged between n-butanol and 0.3-molecular ammonium acetate buffer (pH=7.1) in 2 distribution elements (20 cc. phase volume) and then distributed over 70 stages.

In the distribution elements 14–34 an equivalent positive reaction is obtained with Pauly reagent and ninhydrin.

The paper-chromatographically pure heptapeptide is contained in fractions 20–28 which are combined and evaporated to dryness in vacuo at 40° C. The ammonium acetate is sublimed in a high vacuum at 40° C. Yield: 670 mg.

One recrystallization from aqueous ethanol yields 436 mg. of pure L - methionyl - L - glutaminyl - L - histidyl-L-phenylalanyl-L-arginyl-L-tryptophyl-glycine monacetate melting at 192° C. with decomposition.

$R_f$-values in the Systems 45 and 54: 0.51 and 0.59 respectively. Optical rotation $[\alpha]_D^{26} = 27.4° \pm 1.3°$; (c.=0.985 in dimethyl formamide).

Leucineamino peptidase resolves the heptapeptide completely into its component amino acids.

Quantitative determination of the amino acids by the method of Stein and Moore reveals the correct amino acid composition:

Met¹; Glu¹; His¹; Phe¹; Arg¹; Gly¹; $NH_3^{1.1}$
(tryptophane is destroyed)

High voltage electrophoresis, 45 volts/cm. at pH 1.9 gives on paper only one band which can be colored with Pauly reagent and ninhydrin and also with Sakaguchi reagent. The distance covered in 60 minutes is 15 cm.

The test on frog skin and anolis skin reveals an activity of $2.8–10^5$ units per gram and by the method of Saffran and Schally an extremely strong CRF-activity.

*Example 11.—L-phenylalanyl-nitro-L-arginyl-L-tryptophyl-glycine methyl ester*

3.5 grams (4.6 millimols) of carbobenzoxy-L-phenylalanyl-nitro-L-arginyl-L-tryptophyl-glycine methyl ester (see U.S. patent application Ser. No. 26,956 filed May 5, 1960 by Robert Schwyzer et al., Example 27) are dissolved in 8 cc. of glacial acetic acid with heating; after cooling to room temperature the solution is treated with 8 cc. of 4 N-hydrobromic acid in glacial acetic acid and allowed to react for one hour at room temperature.

The acetic acid is evaporated at 40° C. under reduced pressure, and the syrupy residue is triturated with much absolute ether.

The aqueous pale pink dihydrobromide is exceedingly sparingly soluble in water.

In order to obtain the free tetrapeptide ester the dihydrobromide is distributed between 40 cc. of a mixture of n-butanol and chloroform 1:1 and 5 cc. of 2 N-sodium carbonate solution. The organic phase is washed once with 5 cc. of 2 N-sodium carbonate solution whilst the sodium carbonate extracts are extracted twice again with a fresh mixture of butanol and choloroform. Finally, the organic phases are washed with water until neutral, dried with magnesium oxide and the solvent evaporated down to a small volume. The free tetrapeptide ester is precipitated with much ether, filtered through a G4–glass frit and the filter residue dried in a high vacuum at 40° C.

The yield is 2.66 grams (90% of the theory) of amorphous L-phenylalanyl-nitro-L-arginyl-L-tryptophyl-glycine ethyl ester.

In the paper chromatogram the compound displays only one spot each positive to ninhydrin and Ehrlich.

The $R_f$ values in Systems 52 and 54 are 0.55 and 0.75 respectively.

*Example 12. — N-α:N(im)dicarbobenzoxy-L-histidyl-L-phenylalanyl - nitro - L - arginyl - L - tryptophyl-glycine methyl ester*

2.66 grams (4.2 millimols) of L-phenylalanyl-nitro-L- arginyl-L-tryptophyl-glycine methyl ester and 2.35 grams of N-α:N-(im)dicarbobenzoxy histidine ·CH₃OH are dissolved in 20 cc. of absolute N:N-dimethylformamide, cooled with ice to 0–5° C. and treated with a solution of 1.04 grams (5.1 millimols) of N:N'-dicyclohexyl-carbodiimide in 2.5 cc. of dimethylformamide. Finally, 40 cc. of ice-cold acetonitrile are added and the whole allowed to react overnight at 0° C.

The solution is filtered off from the precipitated urea (960 mg.) and evaporated to a small volume in vacuo. The residue is taken up in much ethyl acetate, washed with N-sodium bicarbonate solution and then with water until neutral.

On evaporation of the dried ethyl acetate solution a portion of the dicarbobenzoxy-pentapeptide ester precipitates (2.85 grams).

Further evaporation and precipitation with ether yield another 1.17 grams of amorphous dicarbobenzoxy-pentapeptide ester.

Crystallization of the combined fractions once from methanol of 95% strength yields 3.7 grams (86% of the theory) of dicarbobenzoxy-L-histidyl-L-phenylalanyl-nitro-L-arginyl-tryptophyl-glycine methyl ester melting at 125–130° C.

In the paper chromatogram in the System 52 the compound migrates with the solvent front.

*Example 13.—L-histidyl-L-phenylalanyl-L-arginyl-L-tryptophyl-glycine methyl ester trihydrochloride*

1.12 grams (1.08 millimols) of dicarbobenzoxy-pentapeptide methyl ester (see Example 12) are hydrogenated to saturation in 50 cc. of methanol with the addition of 5.5 equivalents of methanolic hydrochloric acid and in the presence of 200 mg. of a palladium carbon catalyst of 10% strength. The carbon dioxide formed is absorbed in a second interposed duck-shaped hydrogenating vessel. After 17 hours the evolution of hydrogen ceases. A total of 171 cc. of hydrogen are consumed (theory: 150 cc.). The catalyst is filtered off and the solvent evaporated to dryness.

The evaporation residue is taken up in a little methanol and the trihydrochloride of the pentapeptide ester is precipitated with much absolute ether.

The yield is 880 mg. of granular six pale pink product which contains 1 equivalent of ammonium chloride.

The $R_f$ values in Systems 50 and 54 are 0.55 and 0.62 respectively.

*Example 14.—Tertiary butyloxycarbonyl-L-methionyl-L-glutamyl-(γ-benzyl ester)-L-histidyl-L-phenylalanyl-L-arginyl-L-tryptophyl-glycine methyl ester hydrochloride*

880 mg. (1 millimol) of pentapeptide ester trihydrochloride. 1 ammonium chloride (cf. Example 13) are cooled to 0° C. in 5 cc. of absolute dimethylformamide, treated with 0.305 cc. (2.2 millimols) of triethylamine and stirred for 30 minutes at 0° C. The triethylamine hydrochloride is filtered off, the excess triethylamine evaporated at 30° C. in a high vacuum and treated with a solution, prepared simultaneously and also cooled to 0° C., of 630 mg. (1.34 millimols) of BOC-L-methionyl-L-glutamic acid γ-benzyl ester (cf. St.-Guttmann and R. A. Boissonnas, Helv. Chem. Acta, 41, 1864 (1959)) in 6 cc. of a mixture of dimethyl-formamide and acetonitrile 1:1.

Finally, 275 mg. (1.34 millimols) of dicyclohexyl carbodiimide in 2 cc. of dimethyl-formamide-acetonitrile 1:1 are added and the whole allowed to react overnight at 0–3° C.

The dicyclohexylurea (235 mg.) formed is filtered off, the reaction solution evaporated to a small volume in a high vacuum at 40° C. and the protected heptapeptide ester precipitated with much ethyl acetate.

The precipitate is centrifuged and washed with much ethyl acetate and ether. After drying at 40° C. in a high vacuum, 885 mg. of crude product are obtained.

The paper chromatogram in the System 54 shows in addition to the BOC-heptapeptide ester which migrates with the solvent front, about 20–30 percent of unreacted pentapeptide ester ($R_f$ 0.64).

The crude protected heptapeptide ester is sufficiently pure for the preparation of the free heptapeptide; it is used without any further purification.

*Example 15.—L-methionyl-L-glutamyl-L-histidyl-L-phenyl-alanyl-L-arginyl-L-tryptophyl-glycine acetate*

(a) *Hydrolysis of the ester groups.*—480 mg. of crude BOC-heptapeptide ester (see Example 14) are hydrolysed in 12.5 cc. of dioxane of 60% strength under nitrogen while stirring well for 1 hour with 1.6 cc. of N-sodium hydroxide solution. The pH is 10.7 for the whole hydrolysis. The pH is adjusted to 5.5 with 1 cc. of N-hydrochloric acid, and then to 4.5 with a few drops of glacial acetic acid.

The hydrolysis solution is then evaporated to dryness at 40° C. in vacuo and the evaporation residue is allowed to stand for 10 hours in vacuo over phosphorus pentoxide.

The $R_f$ values for the Systems 43, 50 and 54 are: 0.71, 0.62 and 0.75.

(b) *Cleavage of the BOC group.*—The crude hydrolysis product described under (a) is covered with 5 cc. of anhydrous trifluoracetic acid and allowed to stand for 1 hour at room temperature, the solution turning dark blue. The excess trifluoracetic acid is evaporated at 40° C. under reduced pressure and the residue triturated with much absolute ether.

The trifluoracetate is obtained as a pale bluish granular powder.

For purification the crude product is put into 2 distribution elements with 10 cc. of phase volume and distributed between n-butanol and 0.1 molar ammonium acetate solution (pH 7.0) over 130 stages.

The bulk of the pure heptapeptide is in the elements 42–62. The phases of the elements 42–46, 47–54 and 55–62 are evaporated together.

150 mg. of L-methionyl-L-glutamyl-L-histidyl-L-phenyl-alanyl-L-arginyl-L-tryptophyl-glycine acetate melting at 200° C. (with decomposition) are obtained.

The $R_f$ valves in the Systems 45 and 54 are 0.54 and 0.52, respectively.

In the Saffran and Schally test the heptapeptide shows a strong CRF activity.

*Example 16.—L-N-(3-formyl-2:2dimethylthiazolidine-4-carboxy) - L - glutaminyl-L-histidyl-L-phenylalanyl-L-arginyl-L-tryptophyl-glycine-methyl ester*

480 mg. (0.5 millimol) of glutaminyl-histidyl-phenyl-alanyl-arginyl-tryptophyl-glycine acetate, obtained from the corresponding N-carbobenzoxy-hexapeptide (see U.S. patent application No. 822,187, filed June 23, 1959, by Robert Schwyzer et al., Example 32) by hydrogenation in the presence of a palladium-carbon catalyst of 10% strength in aqueous dimethylformamide of 50% strength, in 5 cc. of dimethylformamide are treated at 0° C. with a solution of 115 mg. (0.6 millimol) of L-4-carboxy-3-formyl-2:2-dimethylthiazolidine (J. C. Sheehan and Ding-Djung H. Yang, J. Amer. Chem. Soc., 80, 1158 [1958]), in 2 cc. of dimethylformamide. After 10 minutes, 130 mg. of N:N'-dicyclohexyl-carbodiimide in 0.5 cc. of dimethylformamide are added and the reaction mixture diluted with 5 cc. of acetonitrile. The reaction mixture is allowed to react for 2 days at 0° C., the precipitated urea is filtered off, the solvent evaporated to a small volume in vacuo and the crude reaction product precipitated with much ethyl acetate. Yield: 490 mg.

In the paper chromatogram the crude product shows only one Pauly-positive spot. The reaction with ninhydrin is negative. $R_{f_{50}}=0.77$; $R_{f_{54}}=0.7$; $R_{f_{56}}=0.77$. The sulfur determination shows the calculated valve. The product is therefore processed directly without any further purification.

*Example 17.*—*L - cysteinyl - L - glutaminyl-L-histidyl-L-phenylalanyl-L-arginyl-L-tryptophyl-glycine*

720 mg. of formyl-dimethyl-triazolidine-carboxy-hexapeptide ester (0.67 millimol) are treated in 10 cc. of dioxane-water (1:1) with 1 cc. of N-sodium hydroxide solution for one hour at room temperature, neutralized with 1 cc. of N-hydrochloric acid and the solvent evaporated at 40° C. in vacuo.

The crude hydrolysis product, still containing salt, is suspended in 6 cc. of dioxane-water (1:1) and heated with 1.8 cc. of N-hydrochloric acid for 2 hours at 95° C. A small amount of flocculent material is filtered off and the solvent evaporated in vacuo. Yield: 500 mg.

400 mg. of crude product are purified by means of continuous high voltage electrophoresis at 1000 volts, 60 milliamperes (buffer 0.5 N-acetic acid, pH 2.3; cardboard 230 made by I. C. Binzer, Filterpapierfabrik, Hatzfeld (Eder), Germany). There are obtained 200 mg. of pure heptapeptide. The path covered in one hour in the high voltage electrophoresis at 3000 volts and at pH 1.9 is 11 cm.

When recrystallized from a mixture of water and ethanol the substance melts at 202–206° C. (decomposition).

A specimen of the heptapeptide which was hydrolysed with 6 N-hydrochloric acid for 15 hours at 115° C. and separated by paper chromatography and electrophoresis showed the expected amino acids.

What is claimed is:

1. Heptapeptides of the formula L$\alpha$-(lower mercaptoalkyl)-$\alpha$-aminoacetyl-L-glutaminyl-L-histidyl - L - phenylalanyl-L-$\alpha$-(lower aminoalkyl)-$\alpha$-aminoacetyl-L-tryptophyl-glycine the mercapto group of which is selected from the group consisting of a lower-alkyl substituted and an unsubstituted mercapto group.

2. Heptapeptides of the formula L-A-L-B-L-histidyl-L-phenylalanyl-L-arginyl-L-tryptophyl-glycine, in which A is a member selected from the group consisting of methionyl and cysteinyl and B is a member selected from the group consisting of glutamyl and glutaminyl.

3. A member selected from the group consisting of L-methionyl - L - glutaminyl - L - histidyl-L-phenylalanyl-L-arginyl-L-tryptophyl-glycine and its acid addition salts.

4. A member selected from the group consisting of L-methionyl-L-glutaminyl-L-histidine and its acid addition salts.

5. L - methionyl - L - glutamyl-L-histidyl-L-phenylalanyl-L-arginyl-L-tryptophyl-glycine.

6. A member of the group consisting of a lower alkyl ester, a benzyl ester, p-nitrobenzyl ester, amide, hydrazide and azide of the heptapeptides claimed in claim 1 and derivatives thereof in which the $\alpha$-amino group is protected by a tertiary butyloxy-carbonyl group and acid addition salts thereof.

7. A member of the group consisting of a lower alkyl ester, a benzyl ester, p-nitrobenzyl ester, amide, hydrazide and azide of the heptapeptides claimed in claim 2 and derivatives thereof in which the $\alpha$-amino group is protected by a tertiary butyloxy carbonyl group and acid addition salts thereof.

8. A member selected from the group consisting of lower alkyl ester, a benzyl ester, p-nitrobenzyl ester, amide, hydrazide and azide of the heptapeptide claimed in claim 5 and derivatives thereof in which the $\alpha$-amino group is protected by a tertiary butyloxy carbonyl group.

9. An acid addition salt of the compound of claim 5.

10. A member selected from the group consisting of lower alkyl ester, a benzyl ester, p-nitrobenzyl ester, amide, hydrazide and azide of the heptapeptide claimed in claim 3 and derivatives thereof in which the $\alpha$-amino group is protected by a tertiary butyloxy carbonyl group.

11. t-Butyloxycarbonyl-L-methionyl - L - glutaminyl-L-histidine hydrazide.

References Cited by the Examiner

UNITED STATES PATENTS

| | | | |
|---|---|---|---|
| 2,524,422 | 1/1948 | Boothe et al. | 260—112.5 |
| 3,093,627 | 6/1963 | Schwyzer et al. | 260—112 |
| 3,121,707 | 2/1964 | Anderson et al. | 260—112.5 |

OTHER REFERENCES

Geschwind et al., J.A.C.S., 78, 4494–4495 (1956).

Schwyzer et al., Helv. Chem. Acta, 42, 1702–1708 (1959).

St. Guttmann et al., Helv. Chem. Acta 41, 1852–1867 (1958) (p. 1864 relied on).

LEWIS GOTTS, *Primary Examiner.*

LEON ZITVER, JAMES A. SEIDLECK, *Examiners.*

DENNIS P. CLARKE, JACQUES M. DULIN, PERRY A. STITH, *Assistant Examiners.*